(12) United States Patent
Gottlieb et al.

(10) Patent No.: US 8,521,709 B2
(45) Date of Patent: Aug. 27, 2013

(54) METHODS FOR PRELOADING MEDIA ASSETS

(75) Inventors: Harry N. Gottlieb, Chicago, IL (US); Evan Jacover, Chicago, IL (US); Steven Fram, Chicago, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 445 days.

(21) Appl. No.: 11/925,460

(22) Filed: Oct. 26, 2007

(65) Prior Publication Data

US 2008/0104121 A1 May 1, 2008

Related U.S. Application Data

(60) Provisional application No. 60/855,938, filed on Oct. 31, 2006.

(51) Int. Cl.
*G06F 7/00* (2006.01)

(52) U.S. Cl.
USPC .......................................... 707/705; 715/716

(58) Field of Classification Search
None
See application file for complete search history.

(56) References Cited

U.S. PATENT DOCUMENTS

| | | |
|---|---|---|
| 4,538,188 A | 8/1985 | Barker et al. |
| 4,831,525 A | 5/1989 | Saito et al. |
| 4,831,580 A | 5/1989 | Yamada |
| 4,852,047 A | 7/1989 | Lavallee et al. |
| 4,875,187 A | 10/1989 | Smith |
| 4,893,256 A | 1/1990 | Rutherfoord et al. |
| 4,931,950 A | 6/1990 | Isle et al. |
| 4,933,880 A | 6/1990 | Borgendale et al. |
| 4,956,773 A | 9/1990 | Saito et al. |
| 5,111,409 A | 5/1992 | Gasper et al. |
| 5,119,474 A | 6/1992 | Beitel et al. |
| 5,261,041 A | 11/1993 | Susman |
| 5,307,456 A | 4/1994 | MacKay |
| 5,386,508 A | 1/1995 | Itonori et al. |
| 5,418,622 A | 5/1995 | Takeuchi |
| 5,430,872 A | 7/1995 | Dahod et al. |
| 5,446,911 A | 8/1995 | Juso et al. |
| 5,515,490 A | 5/1996 | Buchanan et al. |
| 5,519,828 A | 5/1996 | Rayner |

(Continued)

FOREIGN PATENT DOCUMENTS

| | | |
|---|---|---|
| EP | 0 438 299 A2 | 7/1991 |
| EP | 0 661 631 A2 | 7/1995 |

(Continued)

OTHER PUBLICATIONS

"Using Macromedia Flash Asset Xtra (Part I)", 2006, http://hi.baidu.com/anycai/blog/item/998219d193aebbd3572c848b.html.*
Quality America Inc., Flowchart/Cause & Effect Features, Jun. 21, 2000, pp. 1-4.
Goofy Animation System, Technical Report 266, Lindsey Ford Department of Computer Science University of Exeter, Exeter EX4 4PT, U.K. Nov. 5, 1993, pp. 1-15.

(Continued)

*Primary Examiner* — Hung Q Pham

(74) *Attorney, Agent, or Firm* — Brinks Hofer Gilson & Lione

(57) ABSTRACT

A method for preloading media assets during playback execution of a multimedia experience is disclosed. The method includes providing a default preloading scheme. The method also includes receiving a custom instruction to preload at least one media asset associated with a multimedia experience and, in response to the custom instruction, loading the at least one media asset so as to override the default preloading scheme. The method further includes playing the least one media asset after loading the at least one media asset.

9 Claims, 6 Drawing Sheets

(56) References Cited

U.S. PATENT DOCUMENTS

| | | | |
|---|---|---|---|
| 5,530,856 | A | 6/1996 | Dahod et al. |
| 5,546,529 | A | 8/1996 | Bowers et al. |
| 5,555,357 | A | 9/1996 | Fernandes et al. |
| 5,581,759 | A | 12/1996 | Ohhashi et al. |
| 5,586,311 | A | 12/1996 | Davies et al. |
| 5,590,253 | A | 12/1996 | Onishi et al. |
| 5,592,602 | A | 1/1997 | Edmunds et al. |
| 5,619,636 | A | 4/1997 | Sweat et al. |
| 5,630,017 | A | 5/1997 | Gasper et al. |
| 5,640,590 | A | 6/1997 | Luther |
| 5,692,212 | A | 11/1997 | Roach |
| 5,697,788 | A | 12/1997 | Ohta |
| 5,708,845 | A | 1/1998 | Wistendahl et al. |
| 5,717,879 | A | 2/1998 | Moran et al. |
| 5,721,959 | A | 2/1998 | Nakamura et al. |
| 5,752,029 | A | 5/1998 | Wissner |
| 5,754,851 | A | 5/1998 | Wissner |
| 5,806,079 | A | 9/1998 | Rivette et al. |
| 5,818,435 | A | 10/1998 | Kozuka et al. |
| 5,870,768 | A | 2/1999 | Hekmatpour |
| 5,892,507 | A | 4/1999 | Moorby et al. |
| 5,893,105 | A | 4/1999 | MacLennan |
| 5,905,981 | A | 5/1999 | Lawler |
| 6,034,692 | A | 3/2000 | Gallery et al. |
| 6,058,333 | A | 5/2000 | Klein et al. |
| 6,072,480 | A | 6/2000 | Gorbet et al. |
| 6,097,887 | A | 8/2000 | Hardikar et al. |
| 6,100,881 | A | 8/2000 | Gibbons et al. |
| 6,144,938 | A | 11/2000 | Surace et al. |
| 6,154,600 | A | 11/2000 | Newman et al. |
| 6,179,490 | B1 | 1/2001 | Pruitt |
| 6,184,879 | B1 | 2/2001 | Minemura et al. |
| 6,212,674 | B1 | 4/2001 | Suckow |
| 6,239,800 | B1 | 5/2001 | Mayhew et al. |
| 6,243,857 | B1 | 6/2001 | Logan et al. |
| 6,314,569 | B1 | 11/2001 | Chernock et al. |
| 6,334,103 | B1 | 12/2001 | Surace et al. |
| 6,346,945 | B1 | 2/2002 | Mansurov et al. |
| 6,356,867 | B1 | 3/2002 | Gabai et al. |
| 6,370,683 | B1 | 4/2002 | Sobers |
| 6,421,821 | B1 | 7/2002 | Lavallee |
| 6,496,208 | B1 | 12/2002 | Bernhardt et al. |
| 6,654,803 | B1 | 11/2003 | Rochford et al. |
| 6,674,955 | B2 | 1/2004 | Matsui et al. |
| 6,754,540 | B1 | 6/2004 | McFarland et al. |
| 6,816,174 | B2 | 11/2004 | Tiongson et al. |
| 6,873,344 | B2 | 3/2005 | Samra et al. |
| 6,973,639 | B2 | 12/2005 | Hashimoto et al. |
| 7,310,784 | B1 | 12/2007 | Gottlieb et al. |
| 7,340,715 | B2 | 3/2008 | Liu |
| 7,647,577 | B2 | 1/2010 | Wang et al. |
| 7,793,219 | B1 | 9/2010 | Stratton et al. |
| 2002/0038206 | A1 | 3/2002 | Dori |
| 2002/0089527 | A1 | 7/2002 | Paradies |
| 2002/0140731 | A1 | 10/2002 | Subramaniam et al. |
| 2004/0070594 | A1 | 4/2004 | Burke |
| 2004/0196310 | A1 | 10/2004 | Aamodt et al. |
| 2007/0227537 | A1 | 10/2007 | Bemister et al. |
| 2007/0234196 | A1 | 10/2007 | Nicol et al. |
| 2007/0240046 | A1 * | 10/2007 | Yan et al. ............ 715/700 |
| 2008/0065977 | A1 | 3/2008 | Gottlieb et al. |
| 2008/0184143 | A1 | 7/2008 | Gottlieb et al. |
| 2008/0244376 | A1 | 10/2008 | Gottlieb et al. |

FOREIGN PATENT DOCUMENTS

| | | |
|---|---|---|
| EP | 1667115 A2 * | 6/2006 |
| JP | 63 127333 | 5/1988 |
| JP | 5 257666 A2 | 10/1993 |
| JP | 8 96001 | 4/1996 |
| JP | 8 263536 | 10/1996 |
| JP | 2002 120174 | 4/2002 |
| WO | WO 96/19779 | 6/1996 |
| WO | WO 96/26600 | 8/1996 |

OTHER PUBLICATIONS

A Multimedia Presentation Mechanism Permitting Partial Loss of Objects, Han II Kim et al., Dept. of Computer Eng., pp. 847-851 (1992).

Storm Structural and Temporal Object-oRiented Multimedia database system, Michel ADIBA, IMAG-LGI, Grenoble University, BP 53, 38041 Grenoble Cedex 9 France, pp. 12-19 (1995).

Shelldrake Developer, http://www.shelldrake.com/Developergaqs.htm, 3 pages (2000).

Shelldrake Developer, http://www.shelldrake.com/Developer/StoryFirst.htm, 3 pages (2000).

"allCLEAR User's Guide," Version 4.5, SPSS Inc., 1999 (218 pages).

"Anark Studio™ User Guide," Version date: Feb. 16, 2005. 324 pages.

"Cubase SX/SL 3 Music Creation and Production System," Getting Started, Manual by Anders Nordmark, Steinberg Media Technologies GmbH, 2004. 268 pages.

"Cubase SX/SL 3 Music Creation and Production System," Operation Manual, Manual by Anders Nordmark, Steinberg Media Technologies GmbH, 2004. 810 pages.

"Macromedia FLASH™MX 2004 Getting Started with Flash," Macromedia, Inc. 2004. 68 pages.

"Macromedia FLASH™MX 2004 Using Flash," Macromedia, Inc. 2004. 498 pages.

"Macromedia Authorware7 Using Authorware 7," Macromedia, Inc., 2003. 286 pages.

Watts et al., "The SFC Editor: A Graphical Tool for Algorithm Development, Consortium for Computing Science in Colleges," 2004, pp. 73-85.

PCT International Search Report/Written Opinion of the International Searching Authority (the European Patent Office) regarding Application No. PCT/US08/53407, dated May 23, 2008, 8 pages.

PCT International Search Report/Written Opinion of the International Searching Authority (the European Patent Office) regarding Application No. PCT/US2007/087623, dated May 8, 2008, 12 pages.

"Using Authorware passage", Using Authorware, Macromedia, US, Aug. 2001, page complete, XP002343353, pp. 13, 33-34, 41, 48.

Shih, T. K. et al: "Multimedia presentation design using data flow diagrams", Intelligent Processing Systems, 1997, ICIPS '97, 1997 IEEE International Conference on Beijing, China, Oct. 28-31, 1997, New York, NY, USA, IEEE, US, vol. 2, Oct. 28, 1997, pp. 1716-1720, XP010276159, ISBN: 0-7803-4253-4, the whole document.

Bell, M. A. et al.: "CALVIN-courseware authoring language using visual notation", Visual Languages, 1993, Proceedings 1993 IEEE Symposium on Bergen, Norway, Aug. 24-27, 1993, Los Alamitos, CA, USA, IEEE Comp. Soc., US, Aug. 24, 1993, pp. 225-230, XP010032717, ISBN: 0-8186-3970-9, the whole document.

Dick C. A. Bulterman and Lynda Hardman: "Structured Multimedia Authoring", ACM Transactions on Multimedia Computing, [Online] 2005, XP002487484, Retrieved from the Internet: URL: http://homepages.cwi.nl/{dcab/PDF/tomccap05.pdf> the whole document.

PCT International Search Report/Written Opinion of the International Searching Authority (the European Patent Office) regarding Application No. PCT/US2007/087618, dated Jul. 23, 2008, 14 pages.

Office Action regarding U.S. Appl. No. 11/957,076 dated Dec. 7, 2010.

Office Action regarding U.S. Appl. No. 11/957,076 dated Jun. 7, 2011.

Office Action regarding U.S. Appl. No. 12/028,283 dated Feb. 14, 2011.

Office Action regarding U.S. Appl. No. 12/028,283 dated Oct. 24, 2011.

Office Action regarding U.S. Appl. No. 11/975,577 dated Feb. 28, 2011.

Office Action regarding U.S. Appl. No. 11/975,577 dated Nov. 3, 2011.

Office Action regarding U.S. Appl. No. 11/957,066 dated Oct. 13, 2010.

* cited by examiner

METHODS FOR PRELOADING MEDIA ASSETS

RELATED APPLICATIONS

The present patent document claims the benefit of the filing date under 35 U.S.C. §119(e) of Provisional U.S. Patent Application Ser. No. 60/855,938, filed Oct. 31, 2006, which is hereby incorporated by reference.

BACKGROUND

Multimedia technologies have become more and more ubiquitous. A multimedia experience refers to the use of media in an interactive environment. The media generally include one or more types of information content, including for example, text, audio, graphics, animation, and video. During a multimedia experience, the media are presented to an end-user according to a logical sequence that can be affected by the end-user's actions.

It is desirable to provide end-users with responsive and uninterrupted playback of media in a multimedia experience. However, media typically can not be accessed instantaneously during a multimedia experience. For example, media may be stored on a remote host computer, requiring that the media be sent over a network (such as the Internet) to the end-user's computer before it can be played. There is an inherent lag between the time data is requested from a remote host and when it is received and ready to be accessed by the multimedia experience. This time lag can be significant, depending on such factors as network bandwidth and data size.

In order to avoid playback interruptions during a multimedia experience, it is known to provide algorithms to determine which media assets to request in advance so that they will be ready for playback if they are needed. The retrieval of data in advance (while other playback activity takes place) is referred to as "preloading." In general, preloading attempts to ensure that media playback proceeds smoothly and without interruption when media resources are not immediately available. A preloading scheme is, by definition, a set of algorithms that implement rules for determining what media assets to request and when to request them.

In some environments, such as the Macromedia Flash® authoring environment, a multimedia experience proceeds along one or more linear timeliness For linear multimedia experiences, a preloading scheme can anticipate with certainty before the start of the multimedia experience which media will be played back, and in what order. In a multimedia experience that contains conditional branching, i.e., a non-linear multimedia experience, making such advance predictions are difficult. Additionally, often only a part of the total amount of media referenced by a non-linear multimedia experience will be played back during any one playback session. Thus, to request a transfer of all media referenced by the multimedia experience would be inefficient and, in scenarios where bandwidth expenses exist, unnecessarily costly. In order to avoid playback interruptions, a default preloading scheme (as described further below) can be implemented that seeks to strike a balance between requesting too much media that is never ultimately played and requesting enough media to ensure that what actually gets played is available the moment it is needed.

There are situations, however, when default preloading schemes cannot accurately predict how soon to preload certain media assets, such as if those assets are unusually large, or if the time when they'll be played arrives unusually quickly. In such cases, an undesirable break in playback occurs while the remainder of the media is received. To mitigate this problem, it is of considerable benefit for designers to be able to override or customize the default preloading scheme as they deem necessary, in order to force the preloading of certain media assets sooner or later than would otherwise be the case. In other environments, a default preloading scheme may not even exist and the designer may wish to provide a custom preloading scheme of his own. There is a need, therefore, for a method that can be used to overcome the disadvantages discussed above.

BRIEF SUMMARY

This patent discloses tools, methods and systems for preloading media assets as part of an interactive multimedia experience. The tools, methods and systems include providing a default preloading scheme. The tools, methods and systems also include receiving a custom instruction to preload at least one media asset associated with a multimedia experience and, in response to the custom instruction, loading the at least one media asset so as to override the default preloading scheme. The tools, methods and systems further include playing the least one media asset after loading the at least one media asset.

Additional features and advantages of the present invention are described in, and will be apparent from, the following Detailed Description and the figures.

DETAILED DESCRIPTION OF THE DRAWINGS AND THE PRESENTLY PREFERRED EMBODIMENTS

The preferred embodiments described herein are preferably implemented using software and/or hardware components. For example, the preferred embodiments can be implemented with a software application (i.e., computer-readable program code) running on a processor of a general-purpose computer. Alternatively, some or all of the functionality of the application can be implemented with application-specific hardware components. For simplicity, the term "application" shall be used herein to refer generally to the entity (be it software and/or hardware) used to implement the preferred embodiments described below. The term "tool" shall be used interchangeably with the term "application."

Introduction

A multimedia experience can be modeled as a flowchart or any other representation of a branching structure that directly or indirectly references media assets to be played by an application in a predefined order. For example, a flowchart that defines the logical sequence for playback of the multimedia experience generally consists of a sequence of linked cells. The cells represent media content and user interactivity, and the links connecting the cells represent the flow of the multimedia experience through time. The selection of which media referenced in the flowchart will be played can depend, in part, upon the choices made by end-users during each playback session of the multimedia experience.

Figure 1:
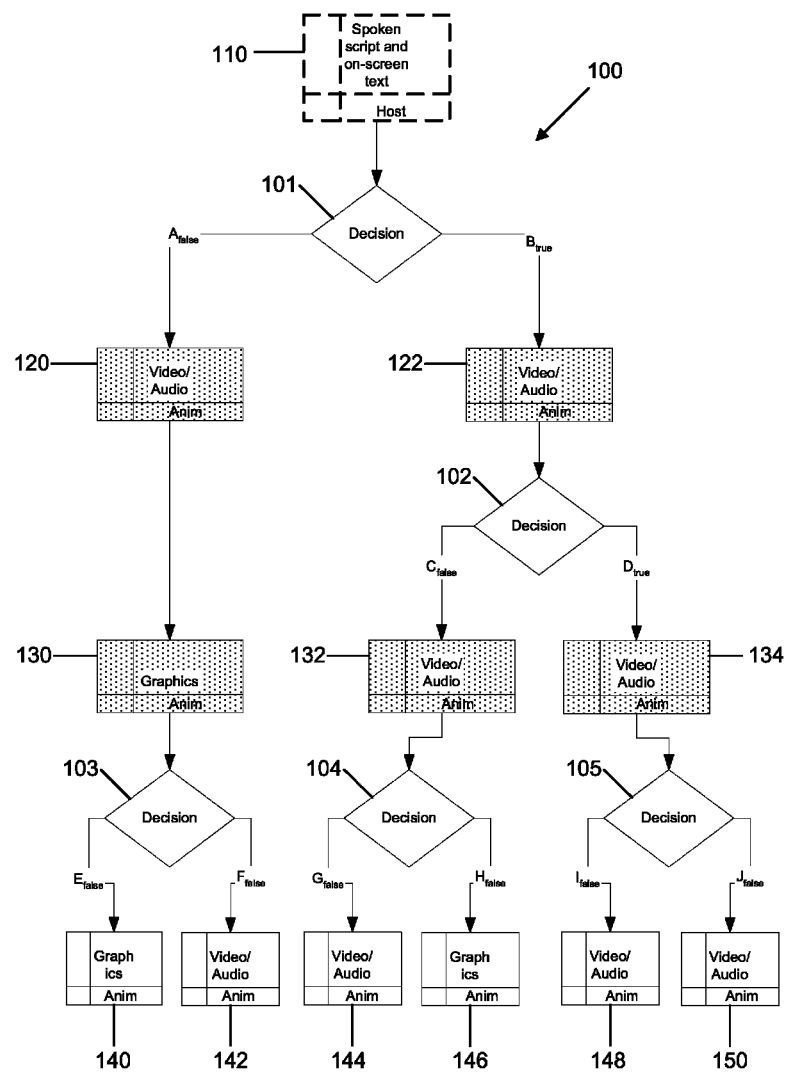
FIG. 1 is an illustration of a flowchart representing a sample interactive multimedia experience using a known default preloading scheme.

Turning now to the drawings, FIG. 1 is an illustration of a flowchart 100 representing a sample interactive multimedia experience using a default preloading scheme. The flowchart 100 comprises a plurality of cells (cells 110-150), some of which are rectangular-shaped and others of which are diamond-shaped. The rectangular-shaped cells are referred to herein as "simple cells," and the diamond-shaped cells are referred to herein as "conditional cells." A simple cell is a cell that contains a single branching link to a single cell. For example, in the flowchart 100 shown in FIG. 1, simple cell 110 branches to conditional cell 101 and simple cell 120 branches to simple cell 130. Unlike a simple cell, a conditional cell contains multiple branching links to multiple cells. The branching links are associated with conditions necessary for that branching link to be followed. For example, in the flowchart 100 shown in FIG. 1, conditional cell 101 branches to simple cells 120 and 122. The branch to simple cell 122 is followed if the condition following the decision implemented by conditional cell 101 is true, while the branch to simple cell 120 is followed if the condition is false.

The cells in a flowchart can contain any suitable content. For example, as in a traditional flowchart drawn on paper, a cell can contain text. A cell can also contain instructions that are implemented by the application (or by another application) when the cell is "played." For example, a cell can contain instructions to trigger a piece of media, gather user input, generate visual or audio information, send/receive information or media to a database, process data, perform a calculation, or perform other functions, such as describing how and when media should be played. Examples of media assets include, but are not limited to, digital audio/video objects representing still art, animation, full-motion video, graphics, on-screen text, music, sound effects, or voiceover dialog. Different cells can have different durations. For example, some cells can be played after a previous cell initiates its function, while other cells can be played after a previous cell finishes its function. (The timing of a cell can also be based on a time X before or after the beginning or end of a cell, and one cell can be played simultaneously with another cell. Timing can also be based off of a common clock. Other timing mechanisms can be used.) A cell can also provide selection choices to a user and evaluate which choice was selected. For example, when conditional cell 101 in FIG. 1 is played, the user is prompted to make a decision and input a response using a user interface device, such as a keyboard, mouse, microphone, remote control, or any other type of device. Conditional cell 101 also determines whether the user input results in "true" or "false" condition.

When played, the cells in the flowchart 100 of FIG. 1 provide an interactive multimedia experience for a user. Playing the flowchart means either that the application itself is executing the flowchart or that another application is executing the flowchart. For example, the flowchart application could export its logic and data to a runtime engine that plays back the multimedia experience using the exported logic and data. In this example, the application and/or runtime engine implements a default preloading scheme that always requests media assets referenced by all potentially reachable cells up to two nodes downstream in the flowchart from the currently playing node. FIG. 1 demonstrates the default preloading scheme for cell 110. When playback execution reaches cell 110, the runtime engine automatically preloads media assets referenced by cells 120, 122, 130, 132 and 134.

However, playback execution can only reach a subset of the media assets referenced by those cells based on the choice the user makes after cell 110. For example, if the user chooses to proceed along branch $B_{true}$, only the media assets referenced by cell 122 and the media assets referenced by either cell 132 or cell 134 will be played back. Thus, in this example, only 2 out of 5 media assets will be played back. Assuming, for example, that all of the media assets are the same size, the usage to preload ratio is about 40%. In other words, while 60% of the media assets transferred over the network never get played, the scheme attempts to ensure that the remaining 40% of media assets that actually get played are always available when needed.

It is possible then that the size of the media assets to be preloaded can exceed the network bandwidth capacity to deliver one of the media assets before playback of the cell that references the media asset begins, i.e., within the amount of time that passes between the start of playback of the current cell two levels upstream and the start of playback of the cell in question. This could be the case if the size of the media being preloaded is larger than expected and/or the duration for playback of the upstream cells is shorter than expected. So, if the combined media size for cells 120 and 122 represent only a small fraction of the size of the media for cell 132, and the user chooses path $B_{true}$ followed by path $C_{false}$, the media for cell 132 may not have been received by the time it is needed. The resulting lag during playback while the remainder of the media for cell 132 is received is undesirable.

For example, assume the following playback conditions (K is for Kilobytes) for preloading audio media: 1) Average data transfer rate of 100 K per second (typical of a consumer-grade DSL connection); and 2) Audio encoding rate of about 17 K per second (equal to 1000 K per minute, a typical MP3 encoding assumption). Also, let the location L represent the location of current playback execution. Using the default preloading scheme described above for preloading two levels of downstream media assets, a lag will not occur if the downstream media assets two levels beneath the cell at location L take less time to retrieve than it takes to play the media assets at the cell at location L and the media assets one level beneath the cell at location L. However, a lag can occur whenever the media assets two levels downstream from the cell at location L take more time to retrieve than it takes to play the media assets at location L and one level beneath the location L. The following equation represents when a lag is possible, should the user choose the cell with the smallest media after the cell at L:

Time to download D>Time to play C, where

D represents the total size in K of the downstream media to preload for the two levels of cells beneath L; and C represents the total size in K of the media at L and the smallest of the media one level beneath L If media downloads at a rate of 100 K/sec, then the time to download D is D/100 sec. Also, if media plays at a rate 17 K/sec, then the play duration of C is C/17 sec. Therefore, a possible lag exists when:

$$D > C \times 100/17,$$

or equivalently, $$D > 5.88 \times C.$$

As a result, a lag could occur under the conditions described above if the size D of the downstream media is greater than about six times the total size C of the media at L and the smallest of the media one level beneath L.

The following table displays possible scenarios with different media durations for the cells of the flowchart shown in FIG. 1 corresponding to whether or not a lag would occur:

TABLE 1

Preload calculations based on the flowchart of FIG. 1.

| Senario | cell 110 (sec.) | cell 120 (sec.) | cell 122 (sec.) | cell 130 (sec.) | cell 132 (sec.) | cell 134 (sec.) | C × 5.88 | D | Playback lag? |
|---|---|---|---|---|---|---|---|---|---|
| 1 | 10 | 8 | 12 | 10 | 9 | 13 | 105.84 | 52 | FALSE |
| 2 | 150 | 150 | 160 | 170 | 180 | 170 | 1764 | 830 | FALSE |
| 3 | 10 | 10 | 10 | 10 | 10 | 700 | 117.6 | 740 | TRUE |
| 4 | 10 | 5 | 10 | 30 | 30 | 30 | 88.2 | 105 | TRUE |

As can be seen from the data in Table 1, when the cells 110, 120, 122, 130, 132 and 134 in FIG. 1 refer to media of roughly the same size, there is no playback lag. When a sufficiently large disparity exists between upstream and downstream cells, the potential for a lag exists. The last row corresponding Scenario 4 in Table 1 illustrates the importance of relative disparity strongly. Here, the media for cell 110 plays for ten seconds, and the end-user could go down path $A_{false}$ in the flowchart, thereby playing the media for cell 120 which lasts for five seconds. Thereafter, no matter which path is chosen, the selected media two levels away from cell 110 will play for only thirty seconds. Assuming a download speed of 100 K per second and an audio encoding rate of about 17 K per second, the downstream media is large enough relative to the upstream media to cause a lag. The example illustrates how the relative difference in media size between cells is what matters, rather than the absolute size.

Figure 2:
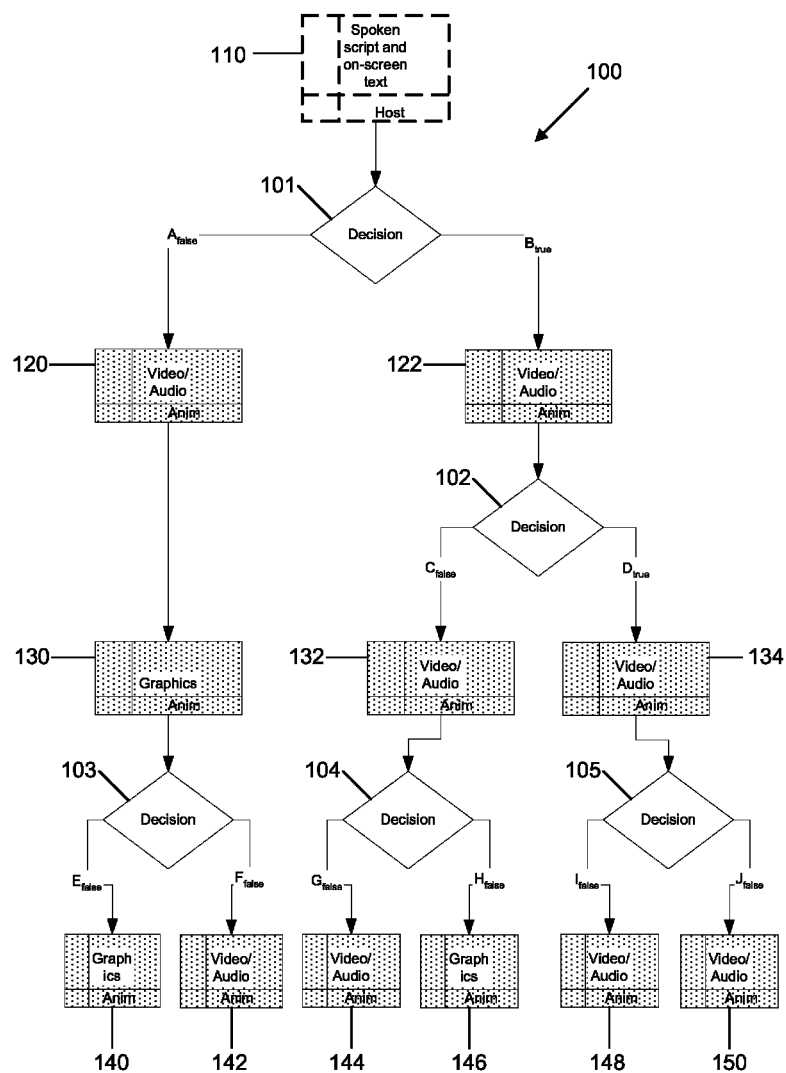
FIG. 2 is an illustration of a flowchart representing a sample interactive multimedia experience using another known default preloading scheme.

While it is possible to implement a different default preloading scheme that increases the number of levels of downstream cells to be preloaded, i.e., starts preloading the media for any given cell earlier, the ratio of media actually played to the amount that is transferred over the network decreases for each additional level of cells that are preloaded. The result is an exponential increase in bandwidth usage, and thus an exponential increase in cost for providing media over the network for the multimedia experience. For example, assuming that the default preloading scheme always requests media referenced by all potentially reachable cells up to three nodes downstream from the currently playing node, FIG. 2 shows all of the cells that are preloaded when playback reaches cell 110 in the flowchart 100. Thus, in this example, only 3 out of 11 media assets will be played back. If all of the media assets are the same size, the usage to preload ratio is about 27%. In other words, 73% of the media assets transferred over the network never get played, as compared to 60% when only two levels are preloaded by the default preloading scheme. Moreover, different multimedia experiences can require different preloading schemes for best performance.

Method 1: Manual Override

Figure 3:
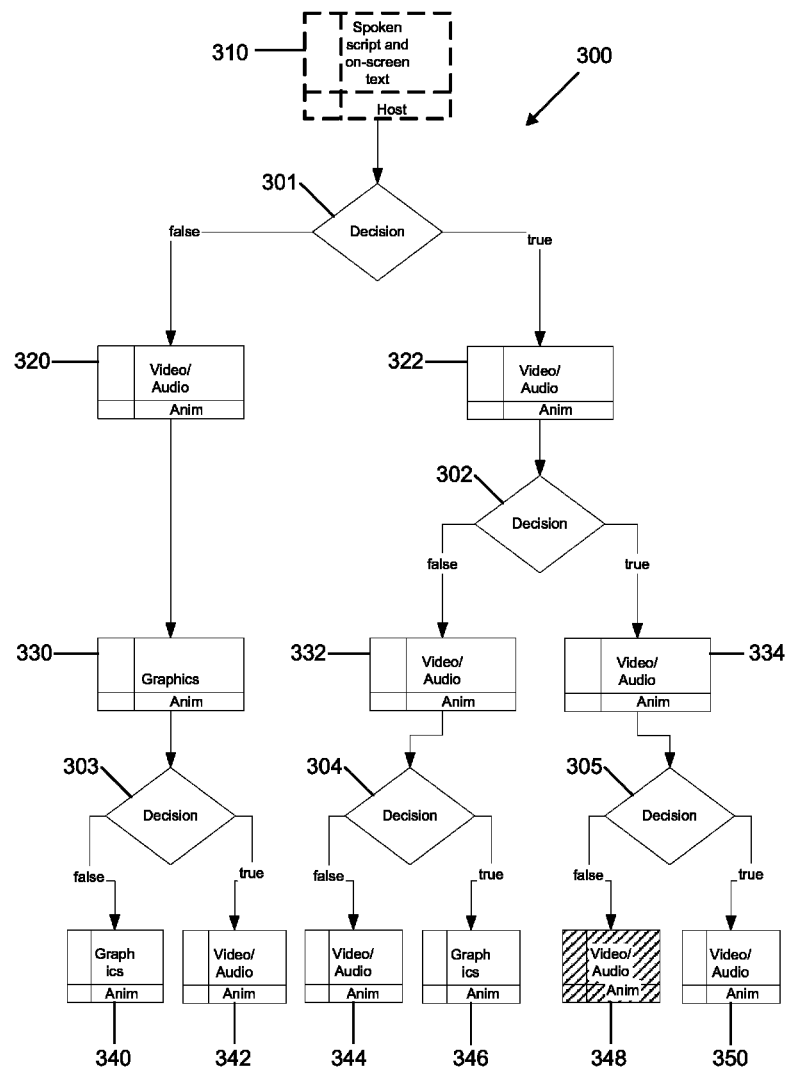
FIG. 3 is an illustration of a flowchart representing a sample interactive multimedia experience using a preloading scheme according to one embodiment of the present invention.

According to one embodiment of the present invention, a multimedia experience can override the default preloading scheme, or provide its own preloading scheme in the absence of a default preloading scheme, by signaling the application and/or runtime engine to preload individual target media assets once playback reaches a specific location L in the multimedia experience. For example, FIG. 3 illustrates a flowchart 300 representing a sample interactive multimedia experience. In this example, the application uses a default preloading scheme that normally requests media assets two levels downstream from a currently playing node in the flowchart 310. Since the flowchart 300 contains cells that do not reference media, the default preloading scheme only pays attention to downstream cells that reference media assets. Intervening non-media cells are ignored when determining which downstream cells to preload. Thus, according to the default preloading scheme, the runtime engine would automatically preload media assets referenced by cells 320, 322, 330, 332 and 334 when playback execution reaches cell 310.

According to the present embodiment, the designer of the multimedia experience can program cells in the flowchart 300 with instructions to preload media assets referenced by individual target cells in the flowchart 300 regardless of the location of the target cells. This is referred to as a "manual override" of the default preloading scheme. As shown in FIG. 3, for example, the cell 310 is programmed with instructions to preload media assets for the target cell 348 when execution reaches the cell 310 even though the target cell 348 is more than two levels downstream from the cell 310.

In order to program the cell 310 with instructions to override the default preloading scheme, a designer selects the cell 310 in a graphical view of the flowchart 300 displayed by the application. In order to select the cell 310, a designer uses a pointing device (such as a mouse or trackball) to move a pointer over the cell 310, and then selects that cell by pressing a selector switch (such as the mouse button). Alternatively, the designer can select the cell 310 using any other type of user interface device. For example, if the cells are numbered, the designer can select the cell 310 by typing in the cell number using a keyboard or by speaking the number of the cell into a microphone.

When the designer selects the cell 310, the application allows a user to edit the content of the cell 310, including instructions to preload media assets referenced by target cells. For example, the application can display a graphical view of the flowchart 300 in a first display region and a textual and/or graphical view of the content of the cell 310 in a second display region. The second display region receives user input for editing the content of the cell 310. As used herein, the term "display region" refers to an area of display on one or more display devices (e.g., computer monitors). The first and second display regions can be fixed or movable and can be non-overlapping or can overlap each other. Additionally, the first and second display regions can be alternately shown (one than the other) in response to a command from the application and/or in response to a command from the user.

Figure 4:
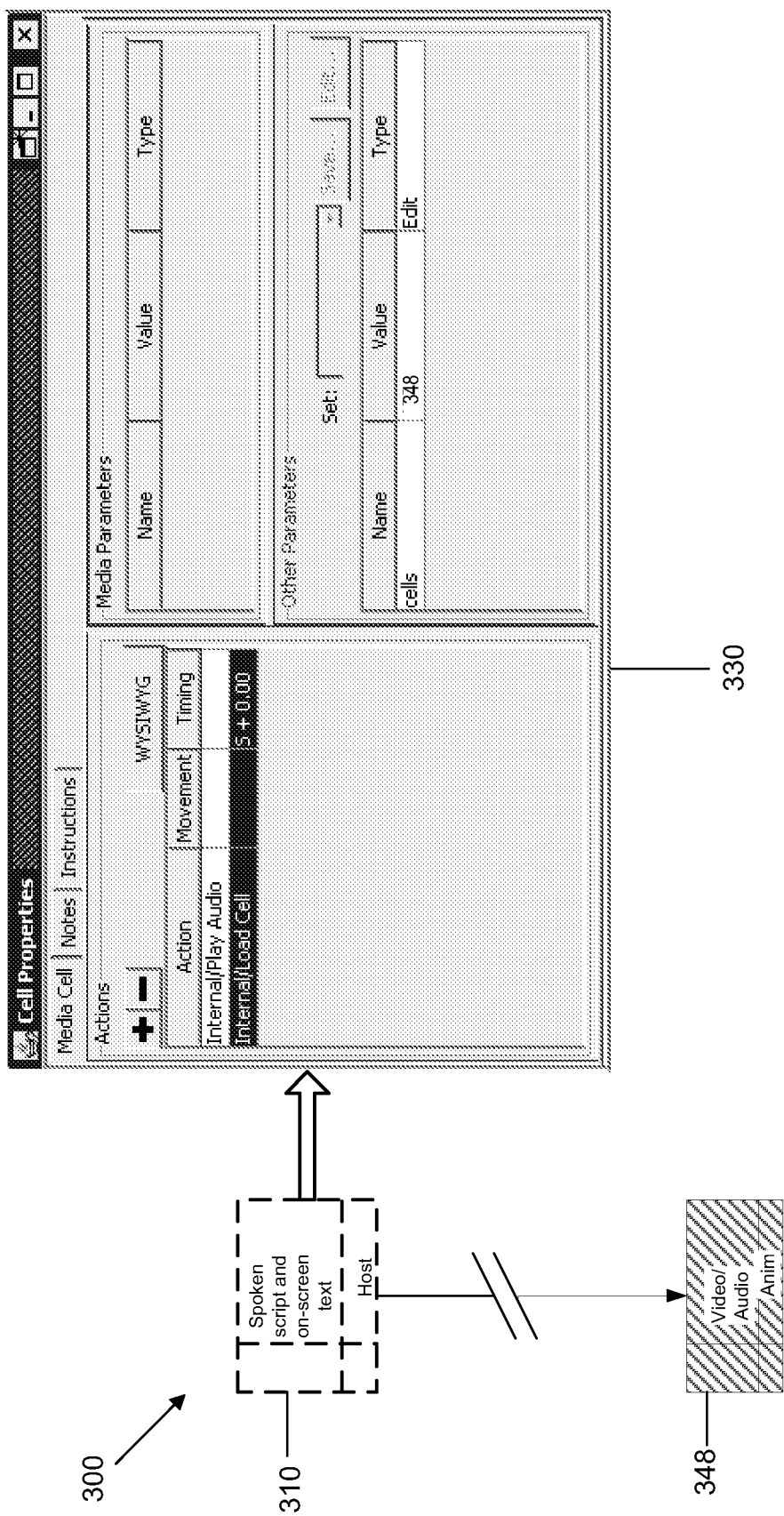
FIG. 4 is an illustration of a flowchart representing a sample interactive multimedia experience and a "Properties Window" for displaying and editing a preloading scheme according to one embodiment of the present invention.

In the present embodiment, the application displays a "Properties Window" 330 in the second display region when the designer selects the cell 310 as shown in FIG. 4. The "Properties Window" 330 displays the content of the cell 310, including preloading instructions, and receives user input for editing the content of the cell 310. The "Properties Window" 330 may display preloading instructions separately or jointly with other cell content. In this example, the designer has specified that the cell 310 will request the media assets referenced by the target cell 348 for preloading. The designer can specify the target cell 348, for example, by typing in the cell number using a keyboard or by speaking the number of the cell into a microphone or by selecting the target cell from a list of cells in the flowchart 310.

During playback, the multimedia experience will signal the application and/or runtime engine to preload media assets referenced by the target cell 348 when execution reaches the cell 310. Thus, the multimedia experience explicitly identifies target cells for preloading media assets referenced by the target cells beyond the normal threshold level set by the default preloading scheme. In this way, a designer has the ability to make individual exceptions to a default preloading scheme, without affecting the default preloading scheme throughout the rest of the multimedia experience.

It will be recognized that other means can be used to program selected cells in the flowchart 300 with instructions to override the default preloading scheme. For example, a designer may edit the content of selected cells in a second display region referred to as an "Editor Pane," which is arranged alongside the first display region and displays a textual view of the content of selected cells. Alternatively, the cells themselves may display content and receive user input to allow a designer to edit the content of a selected cell in-place within the selected cell. It is also possible to provide a third display region for displaying and editing the preloading instructions for all of the cells in the flowchart 300 at once. Likewise, a configuration file may be provided that stores the preloading instructions separately from the multimedia experience represented by the flowchart 300, and the user may edit the configuration file to program cells in the flowchart 300 with preloading instructions.

Method 2: Cell-based Customization

Figure 5:
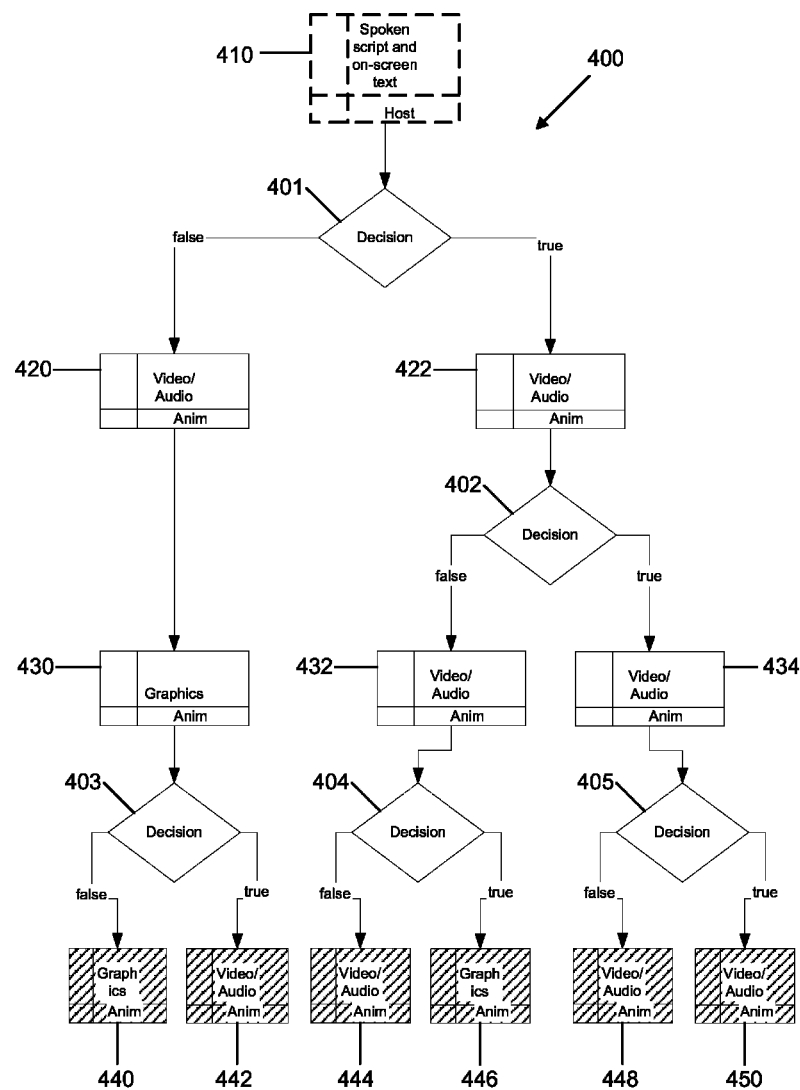
FIG. 5 is an illustration of a flowchart representing a sample interactive multimedia experience using a preloading scheme according to another embodiment of the present invention.

According to another embodiment of the present invention, a multimedia experience can override the default preloading scheme, or provide its own preloading scheme in the absence of a default preloading scheme, by signaling the application and/or runtime engine to preload all media assets falling within a programmable distance V from a specific location L in the multimedia experience. For example, FIG. 5 illustrates a flowchart 400 representing a sample interactive multimedia experience. In this example, the application uses a default preloading scheme that normally requests media assets two levels downstream from a currently playing node in the flowchart 410. Thus, according to the default preloading scheme, the runtime engine would automatically preload media assets referenced by cells 420, 422, 430, 432 and 434 when playback execution reaches cell 310.

According to the present embodiment, the designer of the multimedia experience can program a selected cell in the flowchart 400 with instructions to preload media assets referenced by target cells in the flowchart 400 falling within a distance V from the selected cell. This is referred to as "cell-based" customization. As shown in FIG. 5, for example, the cell 410 is programmed with instructions to preload all media assets for target cells 440-450 falling three levels downstream from the cell 410. A designer can select and edit the content of the cell 410 to program the cell 410 with instructions to override the default preloading scheme as described above. During playback, the multimedia experience will signal the application and/or runtime engine to preload media assets referenced by the target cell 440-450 when execution reaches the cell 410. In this way, the designer can override the default number of levels of cells for preloading specified by the default preloading scheme. Once execution proceeds past the cell 410, the preloading scheme reverts to the default preloading scheme.

A designer may find "cell-based" customization to be particularly useful when the media assets downstream from the cell L are of sufficiently short duration. In that case, some of the media assets downstream from the cell L beyond the number of levels specified by default preloading scheme may not be fully retrieved before those media assets should begin playback. For example, in the flowchart 400, if the media assets referenced by the cells 420-434 are sufficiently short in duration, then the media assets of cells 440-450 may not be fully retrieved before they should begin playback. Thus, the default preloading scheme may not preload a sufficient number of levels of cells to ensure smooth playback. "Cell-based" customization permits the designer to signal the runtime engine to preload more levels of downstream cells than the default preloading scheme, but only while execution is at cell L.

In addition, "cell-based" customization may also be desirable when the media assets downstream from a particular cell L are sufficiently large in size. In that case, when execution reaches one of the child cells of cell L, there will be sufficient time to load the media assets for any grandchild cells during playback of the child cell. For example, if the media assets referenced by the cells 420-450 in the flowchart 400 are sufficiently large, then there will be sufficient time to load the media assets for cell 432 when execution reaches cell 422. "Cell-based" customization allows the designer to signal the application and/or runtime engine to preload media assets for fewer levels of downstream cells than specified by the default preloading scheme while execution is at cell L. In the example above, the designer can specify that media assets referenced by all cells one level downstream from cell 410 should be preloaded, i.e., cells 420 and 422. In this way, the designer can optimize bandwidth usage without sacrificing playback quality by eliminating the unnecessary preloading of the two grandchildren cells 430 and 434 that refer to large quantities of media that ultimately never get played.

Method 3: Global Preload Customization

Figure 6:
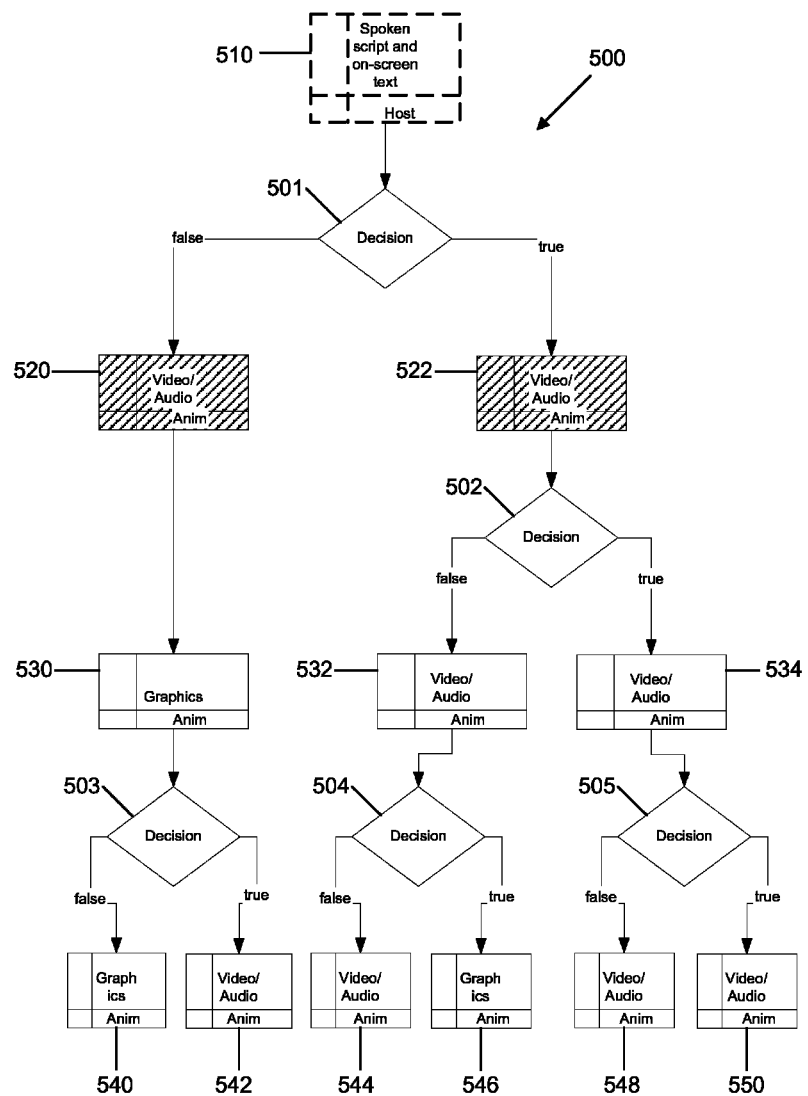
FIG. 6 is an illustration of a flowchart representing a sample interactive multimedia experience using a preloading scheme according to another embodiment of the present invention.

According to another embodiment of the present invention, a multimedia experience can override the default preloading scheme, or provide its own preloading scheme in the absence of a default preloading scheme, by signaling the application and/or runtime engine to apply a different preloading scheme globally for the entire multimedia experience. For example, FIG. 6 illustrates a flowchart 500 representing a sample interactive multimedia experience. In this example, the application uses a default preloading scheme that normally requests media assets two levels downstream from a currently playing node in the flowchart 510. Thus, according to the default preloading scheme, the runtime engine would automatically preload media assets referenced by cells 520, 522, 530, 532 and 534 when playback execution reaches cell 510.

According to the present embodiment, the designer of the multimedia experience can program all of the cells in the flowchart 500 to preload media assets falling within a global distance G from a currently playing node so as to globally change the number of levels of cells to preload specified by the default preloading scheme. This is referred to as "global preload" customization. As shown in FIG. 6, for example, each cell in the flowchart 500 is programmed with instructions to preload all media assets for target cells falling within a global distance G of one level downstream from the current cell whereas the default preloading scheme requests media assets two levels downstream. During playback, when execution reaches the cell 510, the multimedia experience will signal the application and/or runtime engine to preload media assets referenced by the target cells 520, 522 falling one level downstream from the cell 510. A designer can program the cells in the flowchart 500 with instructions to override the default preloading scheme as described above.

In addition, the "global preload" customization can further include dynamically determining during playback different values for the global distance G based on threshold values for the size of media assets referred to by the cells falling within the global distance G. Such thresholds may be specified by the designer. For example, in addition to configuring the flowchart 500 with a global preloading scheme for the flowchart 500, including a global distance G of one level downstream, as discussed above, the designer of the multimedia experience may specify at least one size threshold value T for the global preloading scheme. During playback, the application and/or runtime engine will adjust the value of the global distance G such that the size of media assets referred to by the cells falling within the global distance G is less than the size threshold value T. For example, the application and/or runtime engine may increase the value of the global distance G to two levels downstream when execution reaches the cell 510 if the total size of the media assets referenced by the target cells 520, 522, 530, 532 and 534 is less than the size threshold value T. In this way, the number of levels of downstream cells for preloading is adjusted during playback of the multimedia experience so as to optimize bandwidth usage without sacrificing playback quality.

Alternatively, the global distance G can be determined during playback based on conditions that represent the likelihood of playback proceeding to a subset of downstream cells that fall within a given distance of the currently playing node. Such conditions include, but are not limited to, the types of branches or cells preceding the downstream cells or the types of media contained in the downstream cells. Further, the threshold values for these conditions may be specified by the designer. For example, the designer of the multimedia experience may specify a probability threshold value H for the global preloading scheme. During playback, the application and/or runtime engine will compute the likelihood of execution reaching a subset of the media assets C referred to by the cells falling within the global distance G based on a set of rules, which may also be specified by the designer. The application and/or runtime engine will then adjust the value of the global distance G such that the likelihood of playback proceeding to the subset of the media assets C is greater than the probability threshold value H.

It is intended that the foregoing detailed description be regarded as illustrative rather than limiting, and that it be understood that it is the following claims, including all equivalents, that are intended to define the spirit and scope of this invention.

What is claimed is:

1. In a non-transitory computer readable storage medium having stored therein data representing instructions executable by a programmed processor for supporting a preloading of media assets associated with a multimedia experience, the storage medium comprising instructions operative for:
    providing an interactively programmable executable flowchart representing a multimedia experience;
    receiving a user input indicating a distance V from a location L in the multimedia experience represented in the flowchart; and
    in response to receiving the user input indicating the distance V from the location L, programming the flowchart with at least one instruction to preload when playback execution of the multimedia experience reaches the location L at least one media asset falling within the indicated distance V from the location L.

2. The non-transitory computer readable storage medium of claim 1 wherein the at least one instruction is configured to override a predefined scheme for preloading media assets falling within a fixed distance from the location L during playback execution of the multimedia experience.

3. The non-transitory computer readable storage medium of claim 2 wherein the distance V is static.

4. The non-transitory computer readable storage medium of claim 1 wherein the distance V is dynamic.

5. In a non-transitory computer readable storage medium having stored therein data representing instructions executable by a programmed processor for supporting a preloading of media assets associated with a multimedia experience, the storage medium comprising instructions operative for:
    providing an interactively programmable executable flowchart representing a multimedia experience;
    receiving an input indicating a global distance G for a global scheme for preloading media assets; and
    in response to receiving the input indicating the global distance G, programming the flowchart with the global scheme for preloading media assets, including at least one instruction to preload when playback execution of the multimedia experience reaches each of a plurality of locations in the multimedia experience media assets falling within the global distance G from the each of the plurality of locations in the multimedia experience.

6. The method of claim 5 wherein the at least one instruction is configured to override a default scheme for preloading media assets during playback execution of the multimedia experience.

7. The non-transitory computer readable storage medium of claim 5 wherein the global scheme is configured to dynamically vary the global distance G during playback execution of the multimedia experience based on a playback property of the multimedia experience.

8. The non-transitory computer readable storage medium of claim 7 wherein the playback property includes a total size of a set of media assets falling within the global distance G from the each of the plurality of locations in the multimedia experience.

9. The storage medium of claim 7 wherein the playback property includes a likelihood of reaching one of a set of media assets falling within the global distance G from the each of the plurality of locations in the multimedia experience.

* * * * *